United States Patent
Wang et al.

(10) Patent No.: US 11,966,596 B2
(45) Date of Patent: Apr. 23, 2024

(54) METHOD OF POWER MANAGEMENT USING AN EXPANDER FOR A STORAGE SYSTEM

(71) Applicant: MITAC COMPUTING TECHNOLOGY CORPORATION, Taoyuan (TW)

(72) Inventors: Jyun-Jie Wang, Taoyuan (TW); Yen-Lun Tseng, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 29 days.

(21) Appl. No.: 17/951,014

(22) Filed: Sep. 22, 2022

(65) Prior Publication Data

US 2023/0102777 A1 Mar. 30, 2023

(51) Int. Cl.
*G06F 3/06* (2006.01)
*G06F 1/3234* (2019.01)
(Continued)

(52) U.S. Cl.
CPC .......... *G06F 3/0625* (2013.01); *G06F 1/3246* (2013.01); *G06F 3/0629* (2013.01);
(Continued)

(58) Field of Classification Search
CPC .... G06F 1/3203; G06F 1/3287; G06F 1/3296; G06F 1/3268; G06F 3/0625;
(Continued)

(56) References Cited

U.S. PATENT DOCUMENTS

| 8,769,326 B2 * | 7/2014 | Liu | G06F 1/3234 |
| | | | 713/323 |
| 2013/0232281 A1 * | 9/2013 | Besmer | G06F 3/067 |
| | | | 710/36 |

(Continued)

FOREIGN PATENT DOCUMENTS

TW 201237612 A 9/2012

OTHER PUBLICATIONS

Search Report appended to an Office Action, which was issued to Taiwanese counterpart application No. 110135525 by the TIPO dated Apr. 29, 2022, with an English translation thereof, 2 pages.

*Primary Examiner* — Ji H Bae
(74) *Attorney, Agent, or Firm* — Lewis Roca Rothgerber Christie LLP

(57) ABSTRACT

A method of power management includes steps of: in response to receiving from a server host a sleep command, an expander first outputting a predetermined register value to a processing unit in a normal state, and then switching to a power-saving state and outputting an interrupt signal to the processing unit; the processing unit determining whether both the predetermined register value and the interrupt signal are received; and when it is determined that both the predetermined register value and the interrupt signal have been received, the processing unit controlling a power supply to output standby electricity, making the expander and the processing unit operate based on the standby electricity.

17 Claims, 3 Drawing Sheets

(51) Int. Cl.
*G06F 1/3246* (2019.01)
*G06F 1/3287* (2019.01)
*G06F 1/3296* (2019.01)
*G06F 9/4401* (2018.01)

(52) U.S. Cl.
CPC .......... *G06F 3/0673* (2013.01); *G06F 1/3268* (2013.01); *G06F 1/3287* (2013.01); *G06F 1/3296* (2013.01); *G06F 9/4418* (2013.01)

(58) Field of Classification Search
CPC .... G06F 9/4418; G06F 1/3246; G06F 3/0629; G06F 3/0673
USPC ................................ 713/300, 320, 323, 324
See application file for complete search history.

(56) References Cited

U.S. PATENT DOCUMENTS

| | | | |
|---|---|---|---|
| 2015/0106644 A1* | 4/2015 | Lin ..................... | G06F 11/3062 |
| | | | 713/340 |
| 2016/0335019 A1* | 11/2016 | Li ......................... | G06F 3/0689 |
| 2017/0090543 A1* | 3/2017 | Thielo ................. | G06F 13/4068 |

* cited by examiner

METHOD OF POWER MANAGEMENT USING AN EXPANDER FOR A STORAGE SYSTEM

CROSS-REFERENCE TO RELATED APPLICATION

This application claims priority of Taiwanese Invention Patent Application No. 110135525, filed on Sep. 24, 2021.

FIELD

The disclosure relates to a method of power management, and more particularly to a method of power management to be implemented by a storage system.

BACKGROUND

A conventional storage system includes an expander, a complex programmable logic device (CPLD) and a hard disk drive (HDD). The expander and the HDD support serial attached small computer system interface (SAS) protocols. In response to receiving from a server host a sleep command for allowing the storage system to switch from a normal mode to a power-saving mode, the expander transmits a notification signal to the CPLD in order for the CPLD to power off the HDD or to control the HDD to operate in a power-saving state. In this way, power consumption of the HDD can be reduced when the storage system operates in the power-saving mode. However, the expander itself keeps consuming a significant amount of power.

SUMMARY

Therefore, an object of the disclosure is to provide a method of power management that can alleviate at least one of the drawbacks of the prior art.

According to the disclosure, the method is to be implemented by a storage system. The storage system is electrically connected to a server host, and includes an expander, a processing unit and a power supply. Each of the expander and the power supply is operable in one of a normal state and a power-saving state. The power supply only outputs operation electricity in the normal state and only outputs standby electricity in the power-saving state. A voltage of the standby electricity is lower than a voltage of the operation electricity. The method includes steps of:

in response to receiving from the server host a sleep command for allowing the storage system to switch from a normal mode to a power-saving mode, the expander first outputting a predetermined register value to the processing unit in the normal state;

after outputting the predetermined register value, the expander then operating in the power-saving state and outputting an interrupt signal to the processing unit in the power-saving state;

the processing unit determining whether both the predetermined register value and the interrupt signal are received; and when it is determined that both the predetermined register value and the interrupt signal have been received, the processing unit controlling the power supply to operate in the power-saving state to output the standby electricity, making the expander and the processing unit operate based on the standby electricity.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
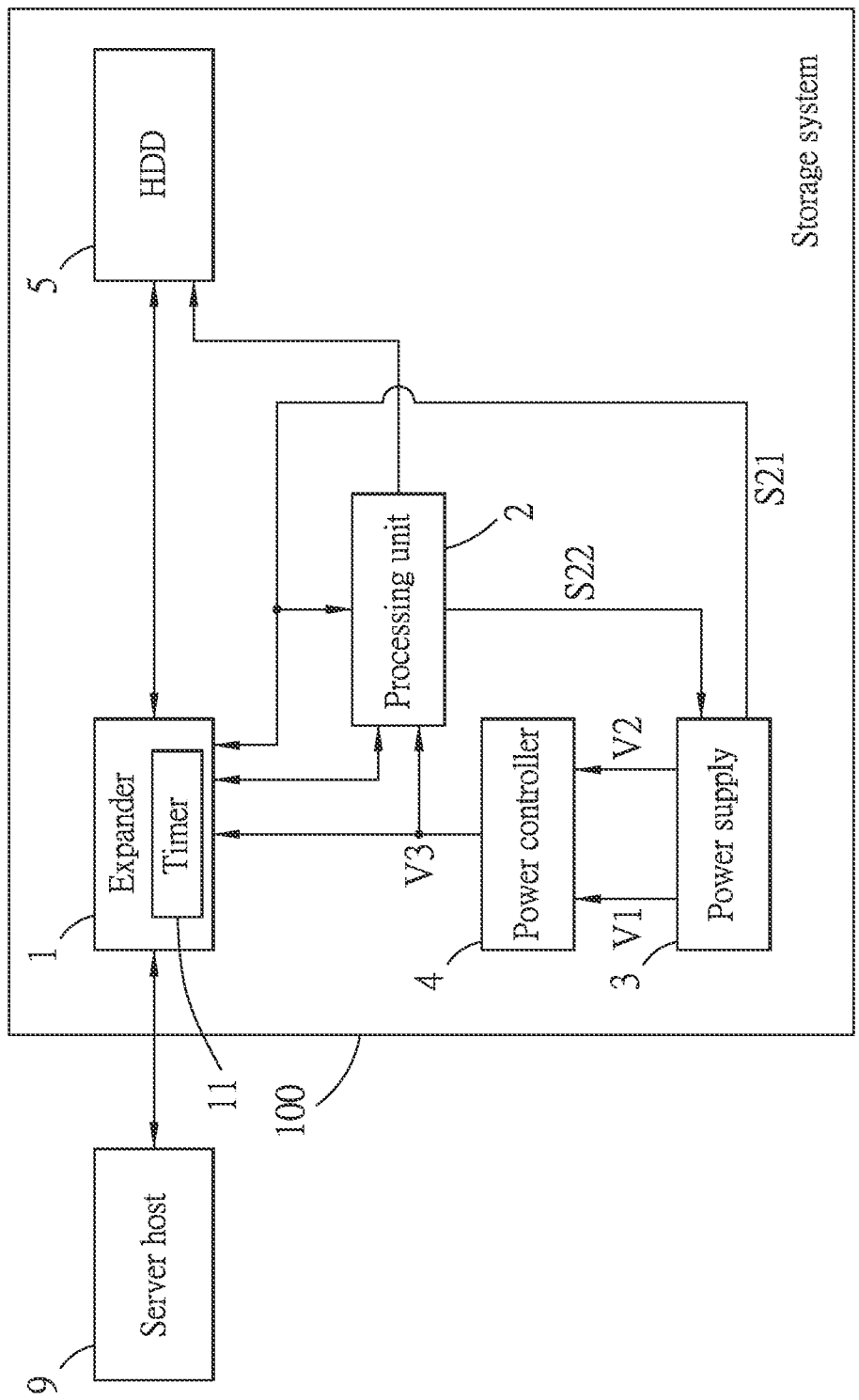
FIG. 1 is a block diagram illustrating an example of a storage system according to an embodiment of the disclosure.

FIG. 1 illustrates a server apparatus including a server host 9, and a storage system 100 that is utilized to implement a method of power management according to an embodiment of the disclosure. The storage system 100 is operable in one of a normal mode and a power-saving mode. The storage system 100 consumes relatively less power in the power-saving mode than that in the normal mode. The storage system 100 may be implemented by a hard disk drive (HDD) enclosure or an HDD chassis, but is not limited thereto.

The storage system 100 is electrically connected to the server host 9. The server host 9 is configured to output to the storage system 100 a sleep command for allowing the storage system 100 to switch from the normal mode to the power-saving mode, and an awaking command for allowing the storage system 100 to switch from the power-saving mode to the normal mode. The server host 9 may be implemented by a computing server, a cloud server or a data server, but is not limited to the disclosure herein and may vary in other embodiments.

The storage system 100 includes an expander 1, a processing unit 2, a power supply 3, a power controller 4 and an HDD 5. It is worth noting that, in other embodiments, a number of the expander 1 may be plural, a number of the processing unit 2 may be plural, a number of the power controller 4 may be plural, and a number of the HDD 5 may be plural.

The expander 1 is electrically connected to the server host 9, the processing unit 2, the power controller 4 and the HDD 5. The expander 1 may be an SAS expander supporting serial attached small computer system interface (SAS) protocols. The expander 1 includes a timer 11 and a plurality of SAS channels. The expander 1 is operable in one of a normal state and a power-saving state. When operating in the normal state, the expander 1 is configured to allow communication to be established via any one of the plurality of SAS channels through the expander 1. On the other hand, when operating in the power-saving state, the expander 1 is configured to allow communication to be established via only one of the plurality of SAS channels through the expander 1 and to disallow communication to be established via the rest of the plurality of SAS channels through the expander 1. In this way, power consumption of the expander 1 is reduced in the power-saving state. It is worth noting that said only one of the plurality of SAS channels allowing communication to be established in the power-saving state is used to enable the expander 1 to receive the awaking command from the server host 9.

The HDD 5 is electrically connected to the processing unit 2. The HDD 5 supports the SAS protocols, and has the "Wake-on-SAS" function defined in the SAS-3 standard or the SAS-4 standard. The HDD 5 is operable in one of a normal state and a power-saving state. When the storage system 100 is in the normal mode, each of the expander 1 and the HDD 5 operates in the normal state to allow the server host 9 to access data stored in the HDD 5. When the storage system 100 is in the power-saving mode, the expander 1 operates in the power-saving state and the HDD 5 is powered off or operates in the power-saving state, disallowing the server host 9 to access the HDD 5. It should be noted that in other embodiments, the HDD 5 may be implemented to support serial advanced technology attachment (SATA) computer bus interface, or may be replaced by other kinds of storage apparatus such as a solid-state drive (SSD), and the expander 1 is implemented to be compatible with the HDD 5, accordingly.

The processing unit 2 is electrically connected to the power supply 3 and the power controller 4. The processing unit 2 is implemented by one of a complex programmable logic device (CPLD) and a microcontroller (MCU), but is not limited to the disclosure herein. The processing unit 2 will remain functional even when the storage system 100 is in the power-saving mode.

The power supply 3 receives utility power, and is controlled by the processing unit 2 to be operable in a normal state to output operation electricity (V1) or a power-saving state to output standby electricity (V2). When a power switch of the power supply 3 (not shown) is turned on (i.e., the storage system 100 is turned on), the power supply 3 is capable of outputting the operation electricity (V1). Specifically, when the power supply 3 receives the utility power and the power switch is turned on, the power supply 3 can be controlled by the processing unit 2 to operate in the normal state to output the operation electricity (V1). The power supply 3 is configured to only output the operation electricity (V1) in the normal state, and to only output the standby electricity (V2) in the power-saving state. A voltage of the standby electricity (V2) is lower than a voltage of the operation electricity (V1). For example, the voltage of the standby electricity (V2) is 5 V, and the voltage of the operation electricity (V1) is 12 V. In addition, when the voltage of the operation electricity (V1) is within a predefined normal range (e.g., from 90% to 110% of 12 V), the power supply 3 is configured to generate a normal voltage signal (S21) indicating that the voltage of the operation electricity (V1) is within the predefined normal range, and to output the normal voltage signal (S21).

The power controller 4 is electrically connected to the power supply 3 for receiving the operation electricity (V1) and the standby electricity (V2). The power controller 4 is configured to output one of the operation electricity (V1) and the standby electricity (V2) as output electricity (V3) for powering the expander 1 and the processing unit 2. The power controller 4 may be implemented by a hot plug controller, but is not limited to the disclosure herein and may vary in other embodiments.

Specifically, the power controller 4 is configured to detect output of the power supply 3 to determine whether the power supply 3 outputs the operation electricity (V1) or the standby electricity (V2). The power controller 4 is configured to output the operation electricity (V1) as the output electricity (V3) for powering the expander 1 and the processing unit 2 when it is determined that the power supply 3 outputs the operation electricity (V1). The power controller 4 is configured to output the standby electricity (V2) as the output electricity (V3) for powering the expander 1 and the processing unit 2 when it is determined that the power supply 3 only outputs the standby electricity (V2).

It is worth noting that the expander 1, the processing unit 2 and the power controller 4 are together referred to as an input/output module (IOM), and the power controller 4 provides protection for the IOM from potential hazards caused by abrupt changes in the output of the power supply 3 supplied to the IOM. It is worth noting that the storage system 100 may include a plurality of IOMs in some embodiments.

Figure 2:
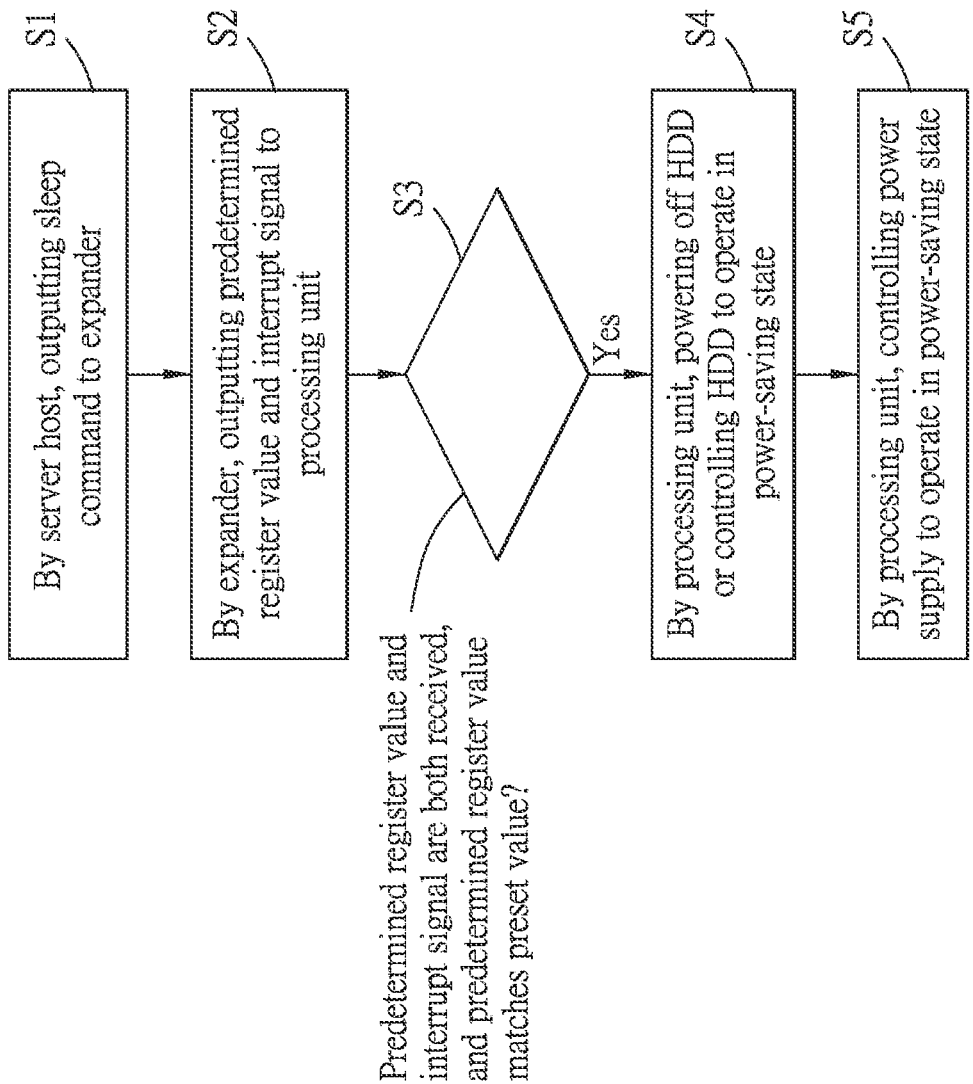
FIGS. 2 and 3 are flow charts illustrating an example of a method of power management according to an embodiment of the disclosure.
Figure 3:
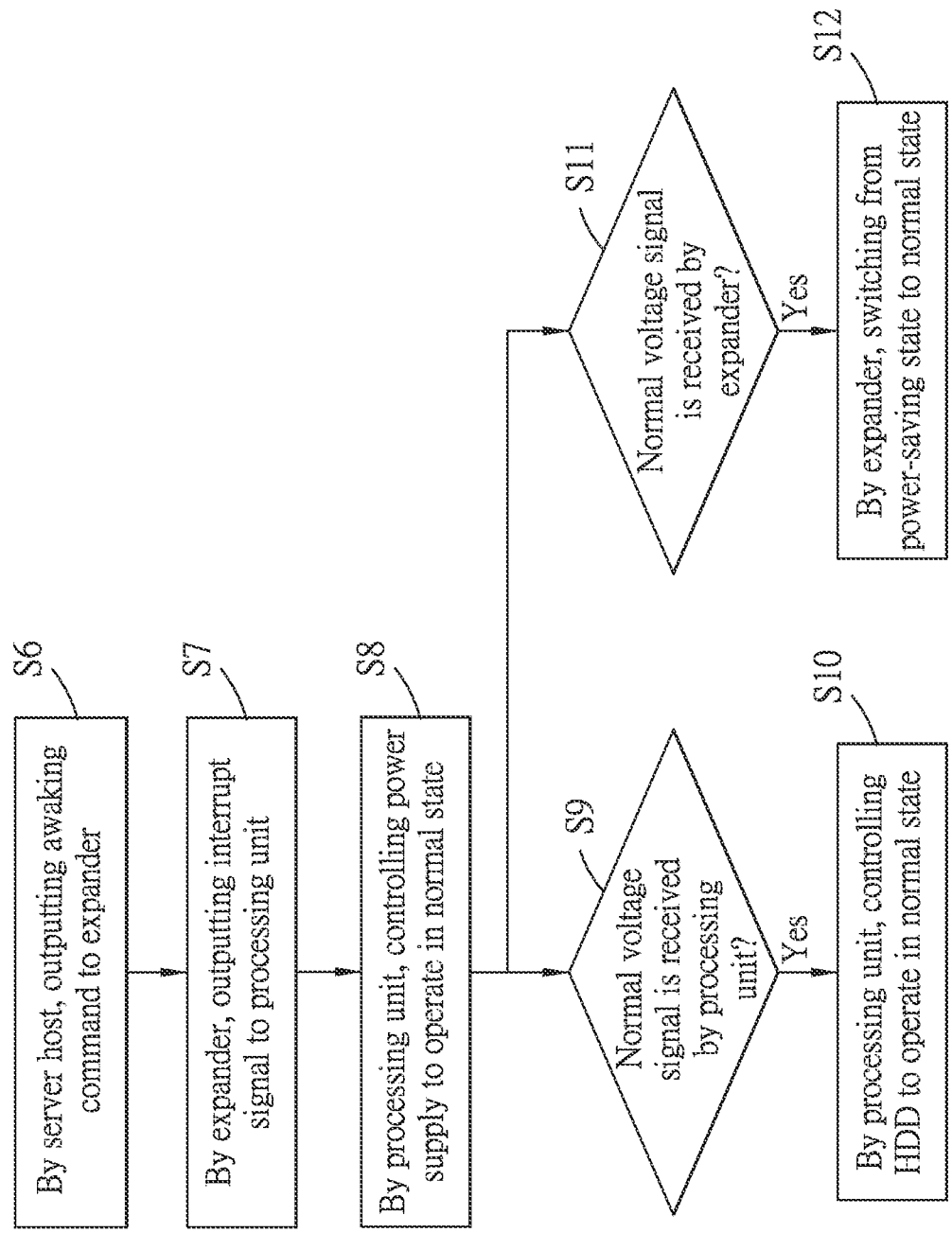

Referring to FIGS. 2 and 3, an embodiment of the method of power management according to the disclosure is illustrated. The method includes a sleep procedure (FIG. 2) and a wake-up procedure (FIG. 3).

The sleep procedure includes steps S1 to S5 delineated below and shown in FIG. 2.

In step S1, the server host 9 outputs the sleep command to the expander 1 of the storage system 100 for allowing the storage system 100 to switch to the power-saving mode.

In step S2, the expander 1 starts the timer 11 to time for a predetermined time period (e.g., three seconds) upon receiving the sleep command. Additionally, in response to receiving from the server host 9 the sleep command, the expander 1 first outputs, in the normal state, a predetermined register value to the processing unit 2 via an inter-integrated circuit (I$^2$C) bus, and writes the predetermined register value into a register of the processing unit 2. After outputting the predetermined register value, the expander 1 then operates in the power-saving state when the predetermined time period has elapsed, and outputs, in the power-saving state, an interrupt signal to the processing unit 2 via a general purpose input/output (GPIO) pin of the processing unit 2. The interrupt signal is exemplarily a pulse, but is not limited to the disclosure herein and may vary in other embodiments.

In step S3, the processing unit 2 determines whether both the predetermined register value and the interrupt signal are received, and determines whether the predetermined register value received from the expander 1 matches a preset value. When it is determined that both the predetermined register value and the interrupt signal have been received, and that the predetermined register value received from the expander 1 matches the preset value, a procedure flow of the method proceeds to step S4. Otherwise, the method is terminated.

In step S4, the processing unit 2 powers off the HDD 5, then the procedure flow proceeds to step S5. The step of powering off the HDD 5 can be implemented by transmitting a power-disabling signal to a third pin of the HDD 5, or by disconnecting the HDD 5 from the power supply 3 via an electronic fuse circuit. In other embodiments, the processing unit 2 may control the HDD 5 to operate in a power-saving state in step S4. When the HDD 5 operates in the power-saving state, the HDD 5 may reduce a rotational speed thereof to achieve a relatively lower power consumption. However, implementation of reducing power consumption of the HDD 5 is not limited to the disclosure herein and may vary in other embodiments.

In step S5, after powering off the HDD 5 (or after controlling the HDD 5 to operate in the power-saving state), the processing unit 2 controls the power supply 3 to operate in the power-saving state to output the standby electricity (V2) as the output electricity (V3) without outputting the operation electricity (V1), making the expander 1 and the processing unit 2 operate based on the output electricity (V3) (i.e., the standby electricity (V2)) Specifically, the processing unit 2 controls the power supply 3 to operate in the power-saving state by transmitting a control signal (S22) via a GPIO pin of the processing unit 2 to the power supply 3.

Since the HDD 5 is powered off or operates in the power-saving state only when a first condition that the predetermined register value and the interrupt signal are both received and a second condition that the predetermined register value received from the expander 1 matches the preset value are both satisfied, risk of accidentally powering off the HDD 5 or accidentally controlling the HDD 5 to operate in the power-saving state may be effectively reduced.

The wake-up procedure includes steps S6 to S10 delineated below and shown in FIG. 3.

In step S6, the server host 9 outputs the awaking command to the expander 1 of the storage system 100 for allowing the storage system 100 to switch from the power-saving mode to the normal mode.

In step S7, the expander 1 outputs, in response to receiving the awaking command from the server host 9, the interrupt signal to the processing unit 2 in the power-saving state in order for the processing unit 2 to control the power supply 3 to operate in the normal state.

In step S8, in response to receipt of the interrupt signal, the processing unit 2 outputs the control signal (S22) to the power supply 3 so as to control the power supply 3 to operate in the normal state to output the operation electricity (V1).

When the voltage of the operation electricity (V1) is within the predefined normal range (e.g., from 90% to 110% of 12 V), the power supply 3 generates the normal voltage signal (S21) indicating that the voltage of the operation electricity (V1) is within the predefined normal range, and outputs the normal voltage signal (S21).

In step S9, the processing unit 2 determines whether the processing unit 2 has received the normal voltage signal (S21). When it is determined by the processing unit 2 that the processing unit 2 has received the normal voltage signal (S21), the processing unit 2 controls the HDD 5 to operate in the normal state in step S10.

Similarly, the expander 1 determines in step S11 whether the expander 1 has received the normal voltage signal (S21). When it is determined by the expander 1 that the expander 1 has received the normal voltage signal (S21), the expander 1 switches from the power-saving state to the normal state in step S12.

To sum up, the expander 1 utilized for the method of power management according to the disclosure is capable of operating in the power-saving state to allow communication to be established via only one of the plurality of SAS channels through the expander 1 when the storage system 100 is in the power-saving mode, thereby reducing power consumption of the expander 1. Consequently, overall power consumption of the whole storage system 100 may be reduced as well.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A method of power management to be implemented by a storage system, the storage system being electrically connected to a server host, and including an expander, a processing unit and a power supply, each of the expander and the power supply being operable in one of a normal state and a power-saving state, the power supply only outputting operation electricity in the normal state and only outputting standby electricity in the power-saving state, a voltage of the standby electricity being lower than a voltage of the operation electricity, said method comprising steps of:
  in response to receiving from the server host a sleep command for making the storage system switch from a normal mode to a power-saving mode, the expander first outputting, in the normal state, a predetermined register value to the processing unit;
  after outputting the predetermined register value, the expander then operating in the power-saving state and outputting, in the power-saving state, an interrupt signal to the processing unit;
  the processing unit determining whether both the predetermined register value and the interrupt signal are received; and
  when it is determined that both the predetermined register value and the interrupt signal have been received, the processing unit controlling the power supply to operate in the power-saving state to output the standby electricity, making the expander and the processing unit operate based on the standby electricity.

2. The method as claimed in claim 1, the storage system further including a hard disk drive (HDD) electrically connected to the expander, said method further comprising a step of:
  the processing unit powering off the HDD when it is determined that both the predetermined register value and the interrupt signal have been received.

3. The method as claimed in claim 2, wherein the step of powering off the HDD includes one of:
  transmitting a power-disabling signal to a pin of the HDD; and
  disconnecting the HDD from the power supply via an electronic fuse circuit.

4. The method as claimed in claim 1, the storage system further including a hard disk drive (HDD) electrically connected to the expander, said method further comprising a step of:
  when it is determined that both the predetermined register value and the interrupt signal have been received, the processing unit controlling the HDD to operate in a power-saving manner.

5. The method as claimed in claim 1, wherein the step of outputting the predetermined register value to the processing unit includes:
  in response to receipt of the sleep command, writing the predetermined register value into a register of the processing unit.

6. The method as claimed in claim 1, the storage system further including a power controller that is electrically connected to the power supply for receiving the operation electricity and the standby electricity and that is configured to output one of the operation electricity and the standby electricity as output electricity for powering the expander and the processing unit, the method further comprising steps of:
the power controller detecting output of the power supply to determine whether the power supply outputs the operation electricity or the standby electricity;
the power controller outputting the operation electricity as the output electricity for powering the expander and the processing unit when it is determined that the power supply outputs the operation electricity; and
the power controller outputting the standby electricity as the output electricity for powering the expander and the processing unit when it is determined that the power supply only outputs the standby electricity.

7. The method as claimed in claim 1, the expander including a timer, the method further comprising a step of the expander starting the timer to time for a predetermined time period upon receiving the sleep command,
wherein the steps of the expander operating in the power-saving state and outputting the interrupt signal to the processing unit in the power-saving state are implemented when the predetermined time period has elapsed.

8. The method as claimed in claim 7, the storage system further including a hard disk drive (HDD) electrically connected to the expander, wherein:
the step of the processing unit determining whether both the predetermined register value and the interrupt signal are received includes determining whether the predetermined register value received from the expander matches a preset value;
the method further comprises a step of the processing unit powering off the HDD when it is determined that the predetermined register value matches the preset value and the interrupt signal has been received; and
wherein the step of the processing unit controlling the power supply to operate in the power-saving state is implemented after the step of the processing unit powering off the HDD, and includes controlling the power supply to output the standby electricity without outputting the operation electricity.

9. The method as claimed in claim 7, the storage system further including a hard disk drive (HDD) that is operable in a power-saving manner, wherein:
the step of the processing unit determining whether both the predetermined register value and the interrupt signal are received includes determining whether the predetermined register value received from the expander matches a preset value;
the method further comprises a step of the processing unit controlling the HDD to operate in the power-saving manner when it is determined that the predetermined register value matches the preset value and the interrupt signal has been received; and
wherein the step of the processing unit controlling the power supply to operate in the power-saving state is implemented after the step of the processing unit controlling the HDD to operate in the power-saving manner, and includes controlling the power supply to output the standby electricity without outputting the operation electricity.

10. The method as claimed in claim 7, the expander supporting serial attached small computer system interface (SAS) protocols and including a plurality of SAS channels,
wherein, in the step of the expander operating in the power-saving state, the expander allows communication to be established via only one of the plurality of SAS channels through the expander and disallows communication to be established via the rest of the plurality of SAS channels through the expander.

11. The method as claimed in claim 1, the method further comprising:
in response to receiving from the server host an awakening command for making the storage system switch from the power-saving mode to the normal mode, the expander making the processing unit control the power supply to operate in the normal state to output the operation electricity;
when the voltage of the operation electricity is within a predefined normal range, the power supply generating a normal voltage signal indicating that the voltage of the operation electricity is within the predefined normal range, and outputting the normal voltage signal;
the expander determining whether the normal voltage signal is received; and
the expander switching from the power-saving state to the normal state when determining that the normal voltage signal is received.

12. The method as claimed in claim 11, the storage system further including a hard disk drive (HDD) electrically connected to the expander, the method further comprising:
the processing unit determining whether the normal voltage signal is received; and
the processing unit controlling the HDD to operate in the normal state when determining that the normal voltage signal is received.

13. The method as claimed in claim 11, the expander supporting serial attached small computer system interface (SAS) protocols and including a plurality of SAS channels,
wherein the step of switching from the power-saving state to the normal state includes making communication be established via any one of the plurality of SAS channels through the expander.

14. The method as claimed in claim 11, wherein:
in the step of the expander enabling the processing unit to control the power supply to operate in the normal state includes outputting the interrupt signal to the processing unit in the power-saving state; and
in response to receipt of the interrupt signal, the processing unit controls the power supply to operate in the normal state to output the operation electricity.

15. The method as claimed in claim 1, wherein the processing unit is implemented by one of a complex programmable logic device (CPLD) and a microcontroller (MCU).

16. The method as claimed in claim 1, wherein:
the step of the expander outputting a predetermined register value includes outputting the predetermined register value to the processing unit via an inter-integrated circuit ($I^2C$) bus; and
the step of the expander outputting the interrupt signal includes outputting the interrupt signal to the processing unit via a general purpose input/output (GPIO) pin of the processing unit.

17. The method as claimed in claim 1, wherein the step of the processing unit controlling the power supply to operate in the power-saving state includes transmitting a control signal via a general purpose input/output (GPIO) pin of the processing unit to the power supply.

\* \* \* \* \*

UNITED STATES PATENT AND TRADEMARK OFFICE
CERTIFICATE OF CORRECTION

PATENT NO. : 11,966,596 B2
APPLICATION NO. : 17/951014
DATED : April 23, 2024
INVENTOR(S) : Jyun-Jie Wang et al.

It is certified that error appears in the above-identified patent and that said Letters Patent is hereby corrected as shown below:

On the Title Page

Insert item (30):
--(30) Foreign Application Priority Data
110135525
Sept. 24, 2021
TW--

Signed and Sealed this
Eighteenth Day of June, 2024

Katherine Kelly Vidal
*Director of the United States Patent and Trademark Office*